Figures 1, 2, 3:
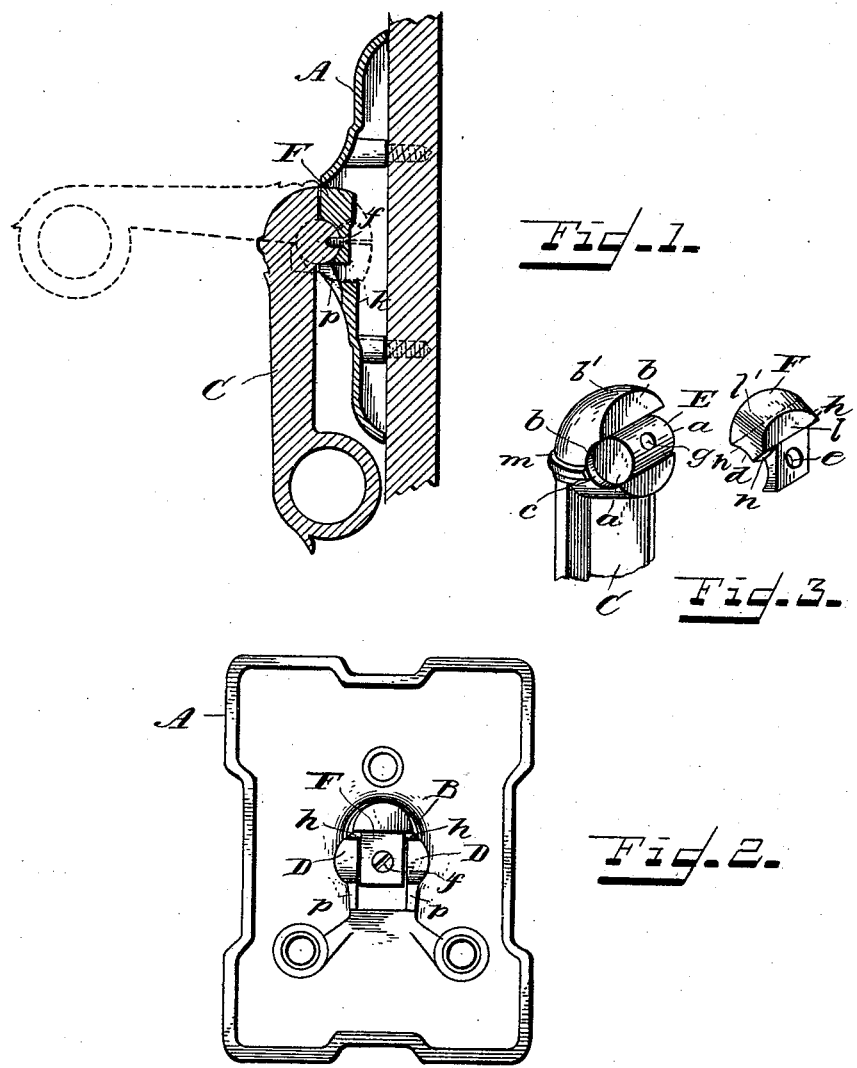

(No Model.)

P. G. OBER.
CASKET HANDLE.

No. 457,365. Patented Aug. 11, 1891.

Witnesses.
J. Thomson Cross
Alfred M. Allen

Inventor.
Philip G. Ober
by Arthur Stem
Attorneys.

UNITED STATES PATENT OFFICE.

PHILIP G. OBER, OF CINCINNATI, OHIO, ASSIGNOR TO THE CRANE & BREED MANUFACTURING COMPANY, OF SAME PLACE.

CASKET-HANDLE.

SPECIFICATION forming part of Letters Patent No. 457,365, dated August 11, 1891.

Application filed March 30, 1891. Serial No. 386,937. (No model.)

*To all whom it may concern:*

Be it known that I, PHILIP G. OBER, a citizen of the United States, residing at Cincinnati, in the county of Hamilton and State of Ohio, have invented certain new and useful Improvements in Casket-Handles, of which the following is a full, clear, and exact description, reference being had to the accompanying drawings, forming part of this specification.

The object of my invention is to provide an improved handle of a high-grade character for use on caskets or other articles; and it consists of the details of construction herein described, and particularly pointed out in the claims.

In the drawings, Figure 1 is a central vertical section of the handle plate and arm. Fig. 2 is a rear view of same. Fig. 3 is a perspective view of the pivot end of the handle-arm and the retaining-cap.

A is the handle or socket plate, of any desired shape or ornamentation, which is secured to the side of the casket in the usual manner.

B is an opening in the central portion of the handle-plate, through which the upper end of the arm C works in the customary way. On each side of this opening B in the plate A are formed the cylindrical lugs or cheeks D D, between which the hub-like portion E of the handle-arm C is arranged to work, the faces $a$ $a$ of the hub E bearing against the inner faces of the cheeks D D—a construction usual in casket-handles of this description.

The upper portion of the handle C is enlarged, as shown in Fig. 3, to form semicircular projections $b$ $b$ around the hub portion E of the handle, and when the handle is adjusted in place between the cheeks D D the semicylindrical faces $c$ $c$ of the arm have their bearing against the cylindrical portions of the cheeks D D. In order to retain the arm C in place with the hub portion E between the cheeks D D of the handle-plate, I provide the cap F. The cap F is formed with a cylindrical recess, as shown in Figs. 1 and 3 at $d$, to fit around the hub E, and a hole $e$ is made therein, through which a screw $f$ is inserted to secure the same to the hub E, a correspondingly-threaded recess $g$ being formed in the hub to receive the screw. The cap F has its upper portion extended to form side projections $h$ $h$, corresponding to the projections $b$ $b$ of the arm C. When the arm C has been adjusted in place within the opening B of the case-plate, the cap F is then firmly secured thereto from the rear by means of the screw $f$. When this is done, it will be manifest that the arm C will be securely pivoted to the case-plate, the cylindrical lugs or cheeks D D of the plate being seated within the cylindrical recesses formed by the projections $b$ $b$ of the arm and the projections $h$ $h$ of the retaining-cap, and the arm will swing freely thereon as a pivot, and that no part of the pivot or its contacting surfaces will be exposed to view. At the lower portion of the opening B and within the exterior surface of the plate is a horizontal shoulder $k$. The retaining-cap F is provided with a broad face $l$, which comes into contact with the shoulder $k$ when the handle is raised for use and prevents the handle from moving upwardly beyond a horizontal position. By this construction the handle is provided with a stop located within the socket-plate, instead of on that part of the handle outside of the plate, as heretofore, and it will therefore be seen that the pivot and stop will always be concealed from view, and consequently none of the worn or abraded surfaces will be exposed to mar the appearance of the handle.

I provide the retaining-cap F with a broad flat face $l'$ opposite the face $l$ and the upper end of the handle-arm with a corresponding face $b'$, which faces come together when the cap is fastened in place. This relieves the strain upon the screw when the handle is in use, and at the same time broad contacting surfaces are obtained between the handle-arm, retaining-cap, and shoulder, and hence a firm supporting connection between said parts.

Opposite inclined surfaces $n$ $n$ are formed on the retaining-cap F and correspondingly-inclined surfaces $p$ $p$ are provided on the socket-plate. These surfaces come together when the handle is raised to a horizontal position and, acting like a wedge, bind the parts firmly together, and thereby prevent any horizontal lateral movement of the handle-arm.

Having thus described my invention, what I claim, and desire to secure by Letters Patent, is—

1. In a handle for caskets, &c., the combination of the socket-plate A, having the cylindrical cheeks D D and shoulder $k$, the handle-arm C, provided with cylindrical recesses $c\ c$ to receive the cheeks D D, and the retaining-cap F, having a face $l$, adapted to engage the shoulder $k$ when the handle is in the position of use, substantially as shown and described.

2. In a handle for caskets, &c., the combination of the socket-plate A, provided with the cylindrical cheeks D D and the inclined surfaces $p\ p$, the handle-arm C, provided with the cylindrical recesses to receive the cheeks D D, and the retaining-cap F, having the inclined surfaces $n\ n$, substantially as shown and described.

3. In a casket-handle, the combination of the socket-plate A, having the cylindrical cheeks D D and shoulder $k$, the handle-arm C, provided with the cylindrical recesses $c\ c$ to receive the cheeks D D and the face $b'$, and the retaining-cap F, having the faces $l\ l'$, substantially as shown and described.

PHILIP G. OBER.

Witnesses:
HARRY G. SCHAEFER,
M. I. PARRY.